United States Patent
Amenta et al.

(10) Patent No.: US 12,257,860 B2
(45) Date of Patent: Mar. 25, 2025

(54) TREAD FOR A WINTER PNEUMATIC TIRE AND A WINTER PNEUMATIC TIRE

(71) Applicant: BRIDGESTONE EUROPE NV/SA, Zaventem (BE)

(72) Inventors: Alessandro Amenta, Rome (IT); Emanuela Paciulli, Rome (IT); Luca Manfre', Rome (IT); Pierfrancesco Triboulet, Rome (IT)

(73) Assignee: Bridgestone Europe NV/SA, Zaventem (BE)

( * ) Notice: Subject to any disclaimer, the term of this patent is extended or adjusted under 35 U.S.C. 154(b) by 805 days.

(21) Appl. No.: 17/284,082

(22) PCT Filed: Oct. 4, 2019

(86) PCT No.: PCT/EP2019/076925
§ 371 (c)(1),
(2) Date: Apr. 9, 2021

(87) PCT Pub. No.: WO2020/078742
PCT Pub. Date: Apr. 23, 2020

(65) Prior Publication Data
US 2021/0347207 A1    Nov. 11, 2021

(30) Foreign Application Priority Data
Oct. 16, 2018 (IT) .................. 102018000009473

(51) Int. Cl.
*B60C 11/12* (2006.01)
*B60C 11/03* (2006.01)
*B60C 11/13* (2006.01)

(52) U.S. Cl.
CPC ...... *B60C 11/0302* (2013.01); *B60C 11/1236* (2013.01); *B60C 11/1263* (2013.01);
(Continued)

(58) Field of Classification Search
CPC ......... B60C 11/0302; B60C 2011/1213; B60C 11/1236; B60C 11/1263; B60C 11/1323; B60C 11/1369; B60C 11/1213
See application file for complete search history.

(56) References Cited

U.S. PATENT DOCUMENTS

| | | | |
|---|---|---|---|
| 5,044,414 A * | 9/1991 | Ushikubo | B60C 11/11 152/209.24 |
| 2015/0083306 A1* | 3/2015 | Colby | B60C 11/04 156/96 |
| 2019/0126690 A1* | 5/2019 | Ishikawa | B60C 11/125 |

FOREIGN PATENT DOCUMENTS

| | | | |
|---|---|---|---|
| DE | 102007061148 A1 * | 6/2009 | ......... B60C 11/0302 |
| DE | 102011055915 A1 * | 6/2013 | |

(Continued)

OTHER PUBLICATIONS

Machine translation for German 102007061148 (Year: 2024).*
(Continued)

*Primary Examiner* — Steven D Maki
(74) *Attorney, Agent, or Firm* — Patterson Intellectual Property Law, PC

(57) ABSTRACT

Tread (1) for a pneumatic tyre, comprising a sequence of tread elements (5) forming an overall "V" shape with two lateral wings (7, 7'), each of said wings being formed from three tread blocks (11, 21, 31) separated therebetween by first and second grooves (15, 16); said three tread blocks (11,21,31) comprise at least one shoulder block (11) provided with at least a first sipe (111) having a "zig-zag" shape; each shoulder block (11) further comprises a channel (112) with a longitudinally evolution which extends on the shoulder block (11), until it reaches and emerges upon the corresponding second groove (15); the channel (112) with a longitudinal evolution comprises an end portion (300, 301) that opens onto said second groove (15), said end portion
(Continued)

(300) having a variable depth, said terminal portion having at least one inclined portion (300) wherein the depth gradually decreases from the outside towards the inside of the pneumatic tyre, as the interface with this second groove (15) approaches.

31 Claims, 10 Drawing Sheets

(52) U.S. Cl.
CPC ...... *B60C 11/1315* (2013.01); *B60C 11/1323* (2013.01); *B60C 11/1369* (2013.01); *B60C 2011/1213* (2013.01)

(56) References Cited

FOREIGN PATENT DOCUMENTS

| | | | |
|---|---|---|---|
| DE | 102011055916 A1 | | 6/2013 |
| EP | 2463123 A1 | | 6/2012 |
| EP | 2965925 A1 | | 1/2016 |
| EP | 3450215 A1 | | 3/2019 |
| JP | 2009-166554 A | * | 7/2009 |
| WO | WO-2017/092896 A1 | * | 6/2017 |
| WO | WO-2017/092898 A1 | * | 6/2017 |
| WO | 20170187960 A1 | | 11/2017 |
| WO | WO-2017/187960 A1 | * | 11/2017 |
| WO | WO-2019/123277 A1 | * | 6/2019 |

OTHER PUBLICATIONS

Machine translation for German 102011055915 (Year: 2024).*
Machine translation for WO 2017/092898 (Year: 2024).*
Machine translation for WO 2017/092896 (Year: 2024).*
Machine translation for Japan 2009-166554 (Year: 2024).*
International Searching Authority: International Search Report dated Apr. 23, 2020 for corresponding International Patent Application No. PCT/EP2019/076925, 4 pages.

* cited by examiner (sec. S1', A'-A')

(sec. S3, C-C)

(sec. S1, A-A)

(sec. S2, B-B)

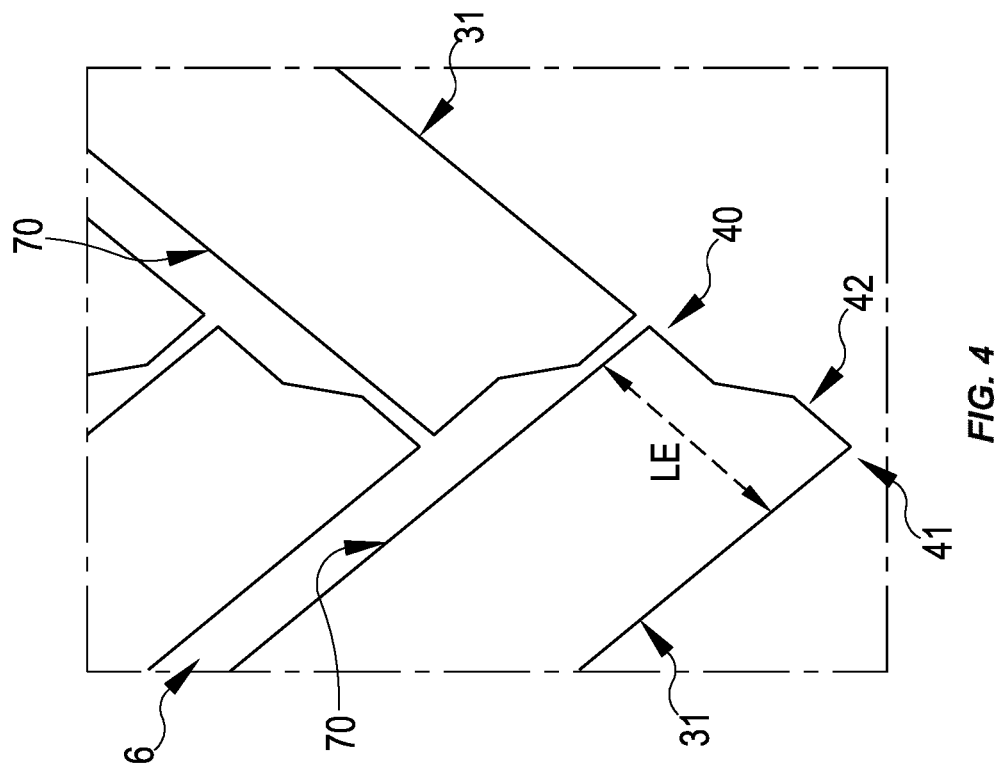

TREAD FOR A WINTER PNEUMATIC TIRE AND A WINTER PNEUMATIC TIRE

TECHNICAL FIELD OF THE INVENTION

The present invention relates to a tread for pneumatic tires. In particular, it relates to a tread for a winter pneumatic tire, wherein the shape thereof makes it particularly effective in dry, wet or snow-covered surface conditions.

BACKGROUND

It is known that pneumatic tires, especially for cars, are designed according to the use for which they are intended, and as a function of the environmental conditions wherein they are to be used.

Hence, on the one hand, there are so-called summer pneumatic tires, which are particularly high-performing at high temperatures on average, wherein the compounds and geometry thereof are well suited for contact with a hot and dry road surface, on the other hand there are so-called winter pneumatic tires, which are particularly high-performing at low temperatures on average, wherein the compounds and geometry thereof are well suited for contact with cold and possibly wet or snow-covered surfaces.

It is also known that in order to obtain good performance from a pneumatic tire under—in one way or another—extreme conditions, technical (form and/or physical/chemical) characteristics are also required that are substantially exaggerated and therefore such that they are not able to satisfy the user under conditions that differ greatly from those for which the pneumatic tire has been designed. In other words, a snow pneumatic tire cannot be high-performing in summer on very hot and dry surfaces, just as a summer pneumatic tire cannot be usefully used in winter on snow-covered surfaces.

This is because, essentially, the characteristics of the form and the type of compounds that a pneumatic tire must have in order to perform well during the summer are often incompatible with those that a pneumatic tire must have in order to perform well during the winter.

Over time therefore pneumatic tires have been developed that can represent a compromise in terms of performance and that can be used throughout the year with good results. This category of pneumatic tires is called "four seasons." It is to be understood however that under extreme conditions, precisely because it is the result of a compromise in terms of efficiency, a four seasons pneumatic tire cannot replace a seasonal pneumatic tire (either winter or summer). For this reason, four seasons pneumatic tires are to be considered as such mainly wherein the climate is such that there are no extreme variations between the four climatic seasons.

It is also clear that in order to also address market based problems, four seasons pneumatic tires cannot be designed that, for performance reasons, degrade too quickly due to "summer" use. The problem is therefore strongly felt of being able to optimize the winter performance of a four seasons pneumatic tire, without affecting the behavior thereof on hot and dry surfaces.

Furthermore, the same winter use of a pneumatic tire poses problems due to the different conditions wherein the pneumatic tire can be used. For example, different behavior and performance are required in the case of wet surfaces (for example due to rain) compared to snow-covered surfaces and again compared to icy surfaces.

In fact, in the case of a wet surface, one of the most important features is the ability to drain the water present between the surface and the tread (for example, in order to prevent/limit aquaplaning phenomena).

For this purpose, the shape of the tread must be such to create channels that are suitable for the rapid outflow of water, both in the direction of travel, and transversely to this. To this end, the elements of the tread must be shaped and positioned in a suitable manner.

By contrast, the shape and/or the positioning of the tread elements must be different in the case wherein the behavior of the pneumatic tire on snow is to be optimized. In this case, those forms and/or positions which retain snow between the blocks, thereby increasing the grip of the tread on the ground, should be given priority.

The two configurations tend towards opposing designs and positionings for the tread elements and therefore, today, a pneumatic tire that has a tread design that is optimal both on wet and snow-covered surfaces, does not exist.

WO2017092896A1 describes pneumatic tires for passenger vehicles, in particular for use in winter driving conditions, comprising a tread segmented by diagonal or transverse grooves, and by circumferential grooves in profiled blocks that have a respective number of incisions.

DE102007061148A1 describes a pneumatic tire for vehicles, in particular for use in winter driving conditions, with a tread that has a central circumferential groove, transverse grooves and transverse grooves.

EP2965925A1 describes a pneumatic tire for vehicles wherein the structures of the tread profile are arranged so as to be optimized for noise, according to a method of varying the length of the step in a sequence of steps with steps that have at least two different lengths.

DE102011055916A1 describes a pneumatic tire for vehicles, in particular a pneumatic tire for passenger cars, with a tread that has grooves and tread blocks, that have a depth that is lower in the central region than in the lateral areas.

EP2463123A1 describes a pneumatic tire which has a profile formed by diagonal grooves, which are offset in one of the halves of the tread in relation to the other half of the tread in a circumferential direction.

WO2017092898A1 describes pneumatic tires for vehicles, in particular for use in winter driving conditions, comprising a directional tread, which is divided into shoulder blocks and central blocks by diagonal grooves that extend across the width of the tread in a substantially V-shaped manner and by means of circumferential grooves that connect the diagonal grooves adjacent to each other.

For the purposes of the present invention, by the term "tread element" it is intended a portion of the tread pattern that is repeated, identical to itself, along the entire length of the tread.

By the term "tread component," or simply "component", it is intended any tread block, or else a rib of the tread, regardless of the form and/or positioning thereof.

The term "tread block", or simply "block", refers to any tread block of the tread, regardless of the form and/or positioning thereof.

The term "contact surface" refers to that portion of a surface of a block that, during the rolling of the pneumatic tire, comes into contact with the ground.

The term "leading edge" refers to an edge of the block along the profile of the contact surface that, during the rolling of the pneumatic tire, meets the soil prior to the contact surface.

The term "trailing edge" refers to an edge of the block along the profile of the contact surface that, during the rolling of the pneumatic tire, leaves the ground after the contact surface.

The term "leading surface" refers to a wall of the block that is contiguous to the contact surface by means of the leading edge.

The term "trailing surface" refers to a wall of the block that is contiguous to the contact surface by means of the trailing edge.

The term "groove" refers to the tread portion that separates two adjacent blocks.

The term "grooved channel", or simply "channel", refers to the inner portion of a groove, generally recessed in relation to the contact surface of the adjacent blocks.

The term "notch" (or "sipe") refers to a thin and generally narrow groove on a tread component, obtained by the molding of the pneumatic tire, that is intended to improve the performance of the pneumatic tire on snow and ice.

SUMMARY OF THE INVENTION

The technical problem addressed and resolved by the present invention is therefore that of providing a tread having a design that is such to represent the best possible compromise and to therefore enable effective use of the pneumatic tire during the winter season, and in particular both under wet and snow-covered surface conditions, especially when braking.

BRIEF DESCRIPTION OF THE FIGURES

The advantages, together with the characteristics and the usage of the present invention, will become clear from the following detailed description of preferred embodiments thereof given purely by way of non-limiting example.

Reference will be made to the figures of the accompanying drawings, wherein:

FIG. 4 is a detail view of the vertex of the "V" of a tread element of FIG. 1;

DETAILED DESCRIPTION OF EMBODIMENTS OF THE INVENTION

Some embodiments of the present invention will be described below, making reference to the above figures.

Figure 1:
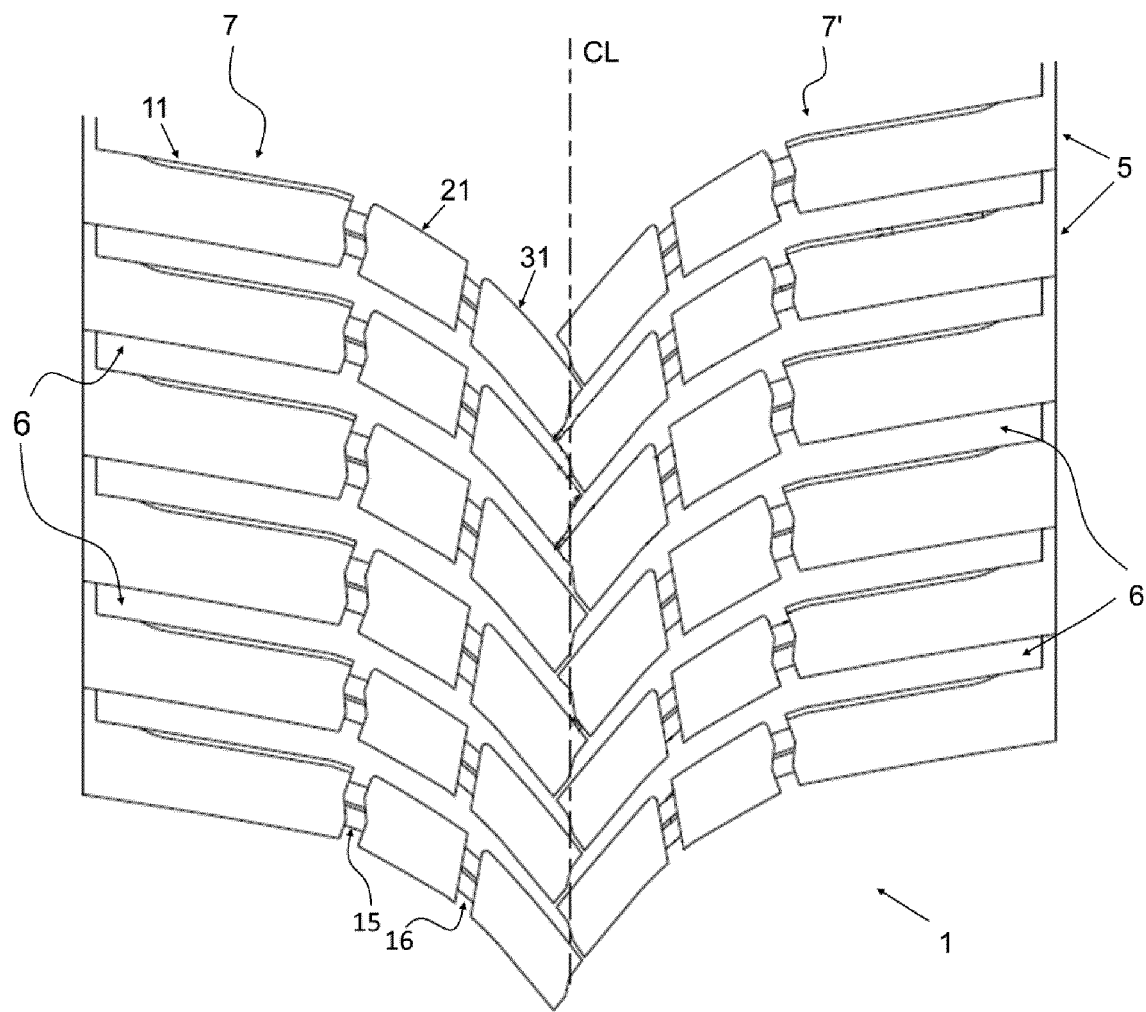
FIG. 1 is a plan view of a portion of a tread according to the present invention that shows only the main components thereof.

With initial reference to FIG. 1, this schematically shows the main components of a tread 1 for a winter pneumatic tire according to the present invention, The tread 1 comprises a sequence of tread elements 5 placed in succession and interspersed with first grooves 6.

Each tread element 5 has an overall "V" shape with two lateral wings 7, wherein each is formed from three tread blocks 11, 21, 31 (a shoulder block, a median block and a central block) separated by second grooves 15, 16.

The "V" shape of the tread elements is considered to be particularly effective, especially during braking, and especially on wet and/or snow-covered surfaces.

This is due to the fact that during the rotation of the pneumatic tire, the blocks that form the wings of the "V" of each element come into contact with the ground, one after the other (from the center of the pneumatic tire towards the outside), therefore modulating the overall performance of the pneumatic tire in terms of adherence.

Figure 2:
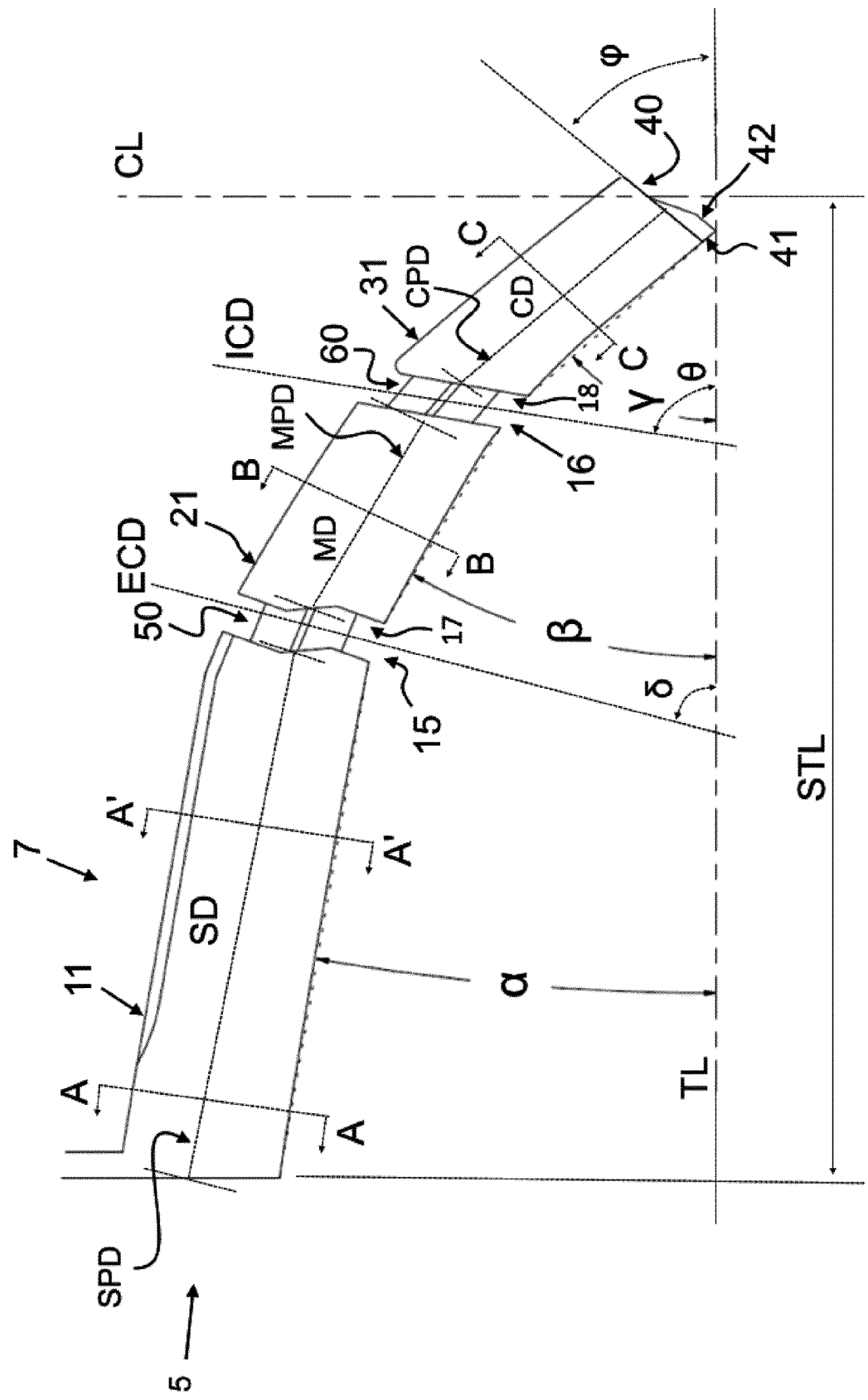
FIG. 2 is a detail view of one of the lateral wings of a tread element according to the invention.

Referring now to FIG. 2, this shows in more detail a single wing 7, of the "V" shaped tread element 5.

According to the present invention, the three tread blocks 11, 21, 31 comprise at least one shoulder block 11 which has a first major extension direction SPD inclined by a first angle $\alpha$ with respect to a transverse line TL, orthogonal to a center line CL of the tread.

According to preferred embodiments of the present invention, this first angle $\alpha$ ranges between 8° and 12°.

In principle, this first angle may also be less than that specified above. However, in consideration also of other factors that will be discussed below, much lower angles than those indicated, up to the limit of 0°, would result in excessive noise during the rolling of the pneumatic tire. The noise would be due to the fact that the leading edge 13 of the shoulder block 11 would meet the ground at the same instant (or almost) over the entire longitudinal evolution of the block. Since this is naturally a repetitive pattern, this would lead to the emission of noise at frequencies that are dependent upon the rolling speed.

This behavior would be aggravated by the fact that, for the purposes of the present invention, the shoulder block 11 may preferably have a longitudinal extension dimension SD equal to at least 40% of a transverse semi-dimension STL of the tread or, preferably, at least 50%. According to a preferred embodiment, the longitudinal extension dimension SD is selected to be equal to approximately 55% of the transverse semi-dimension STL of the tread.

In particular, according to some embodiments, the first angle $\alpha$ can range between 9° and 11°, or even more preferably equal to approximately 10°.

In particular, a value of the first angle $\alpha$ which, according to the present invention, optimizes the behavior of a pneumatic tire of the size 205/55 R16, is 11.4°.

According to the present invention, the three tread blocks 11, 21, 31 of each wing of the "V", also comprise a median block 21 which has a second major extension direction MPD inclined by a second angle $\beta$ with respect to the transverse line TL, orthogonal to center line CL of the tread.

In particular, according to some embodiments, the second angle $\beta$ can range between 27° and 47°, or even more preferably equal to approximately 36°.

In particular, a value of the second angle $\beta$ which, according to the present invention optimizes the behavior of a pneumatic tire of the size 205/55 R16, is 30.5°.

Advantageously, according to some embodiments, the size of the median block 21 has a longitudinal extension dimension MD equal to at least 20% of a transverse semi-dimension STL of the tread. According to a preferred embodiment, the longitudinal extension dimension MD is chosen to be equal to around 22% of a transverse semi-dimension STL of the tread.

Furthermore, according to the present invention, the three tread blocks 11, 21, 31 comprise a central block 31 which in turn has a third major extension direction CPD inclined by a third angle γ with respect to the transverse line TL, orthogonal to the center line CL of the tread.

In particular, according to some embodiments, the third angle γ can range between 45° and 66°, or even more preferably equal to approximately 56°.

In particular, a value of the third angle γ which, according to the present invention optimizes the behavior of a pneumatic tire of the size 205/55 R16, is 54.2°.

According to some embodiments, intended for an ultra-high performance (UHP) winter pneumatic tire, for example with the dimensions SW 245-315 mm, the third angle γ is chosen to be around 45° and 55°, preferably around 50°. This maximizes the drainage of water on wet surfaces. In this way, on wet surfaces, the aquaplaning limit increases and the braking distances reduce.

Advantageously, according to some embodiments, the central block 31 has a longitudinal extension dimension CD equal to at least 20% of a transverse semi-dimension STL of the tread.

According to a preferred embodiment, the longitudinal extension dimension CD is selected to be equal to around 21% of a transverse semi-dimension STL of the tread.

As described above, the geometry of the three blocks 11, 21, 31 has been defined as a function of the respective major extension directions thereof. In the present invention, "major extension direction" refers to the direction of a line that best represents the evolution of the respective block.

For example, such a line could be identified in a longitudinal median line of the same block. Or, in the case of blocks—in particular the shoulder block—which have a substantially rectilinear longitudinal evolution (or in any case with a particularly large radius of curvature), the major extension direction could be identified with the longitudinal line that joins two consecutive extreme vertices of a block. It is assumed that the two definitions can be considered equivalent by virtue of the geometrical characteristics of the blocks which, according to the present invention, have substantially constant respective transverse dimensions and, as mentioned, an almost rectilinear evolution.

It should also be noted that the first angle α, the second angle β and the third angle γ can also be varied, whilst remaining within the indicated ranges, as a function of the size of the pneumatic tire.

In particular, the specific values indicated above, may for example be in relation to a reference pneumatic tire with the dimensions 205/55 R16. Pneumatic tires of different sizes may have different α, β and γ angles.

The following FIGS. 3A, 3B, 3C, 3D, show some sectional views, taken along respective lines identified in FIG. 2.

According to some embodiments of the present invention, the shoulder block 11 has a first cross-section 51, taken along the line A-A of FIG. 2, A-A having a substantially trapezoidal form, wherein a first leading surface 1001 of the block 11 is inclined by approximately 10° with respect to a direction ND, normal to the tread, and a second trailing surface 1002 inclined by around 5° with respect to said direction ND, normal to the tread.

Advantageously, the shoulder block 11 can have, at least in a portion thereof, a beveled trailing edge 12. From this derives a cross-section, for example taken along the line A'-A' of FIG. 2, featuring a slightly different evolution, in particular visible in FIG. 3B.

The presence of a beveled leading edge results in greater efficiency during the action of braking, avoiding or at least reducing the effect of the rolling of the trailing edge. This rolling effect is typical and particularly accentuated when the trailing edge is substantially shaped as a sharp edge, and therefore the friction during braking produces deformation of the contact surface causing a reduction in the surface area of the rubber that is in contact with the ground, leading to a reduction in terms of friction and therefore grip.

According to the present invention, the shoulder block 11, and the median block 21 are separated by an external groove 15 of said second grooves 15, 16.

The outer groove 15 has an outer grooved channel 17 which has a first channel direction ECD that is inclined in relation to the transverse line TL by an external angle δ of less than 90°, thus ensuring that the channel direction ECD is not exactly parallel to the center line CL of the pneumatic tire. This is advantageous in terms of performance on snow.

According to some embodiments, the outer grooved channel 17 is not rectilinear, preferably "Z" shaped, with the aim of improving the performance of the pneumatic tire in the case of braking on a snow-covered surface.

According to some embodiments, within the outer grooved channel 17 further tread elements can be provided, in particular a first connecting element 50 between the shoulder block 11, and the median block 21.

Figure 2A:
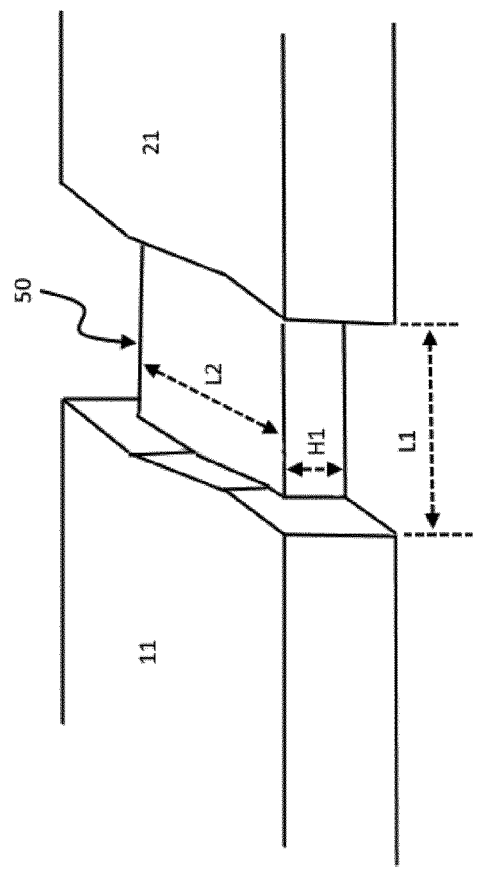
FIGS. 2A and 2B are exemplary detail views of possible connecting elements between the tread blocks.

FIG. 2A shows, by way of example and schematically, the structure thereof.

This first connecting element 50 preferably has a height that is less than the height H1 of the connected blocks (the shoulder block 11 and the median block 21).

In addition, the width L1 thereof (the transverse dimension of the channel) is preferably less than the length L2 thereof (the longitudinal dimension of the channel). According to a preferred embodiment, the width L1 can be chosen to be equal to approximately 3% of the transverse semi-dimension STL of the tread.

Again, with reference to FIG. 2, the median block 21 preferably has a longitudinal evolution that is substantially rectilinear.

Figure 3B:
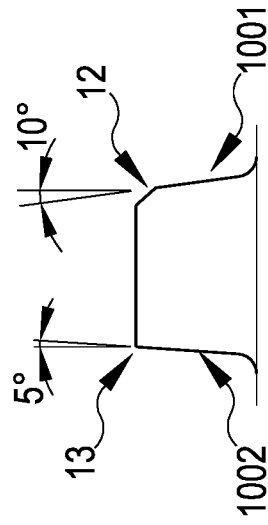
FIGS. 3A, 3B, 3C, 3D are sectional views of the tread element of FIG. 2, taken respectively along the lines A-A, A'-A', B-B, C-C.
Figure 3D:
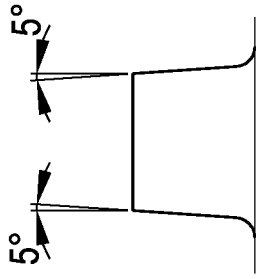
Figure 3A:
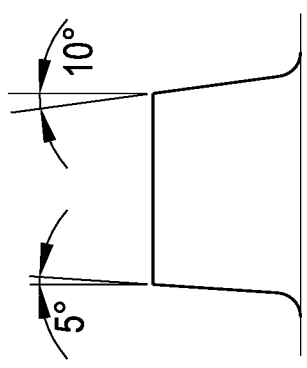
Figure 3C:
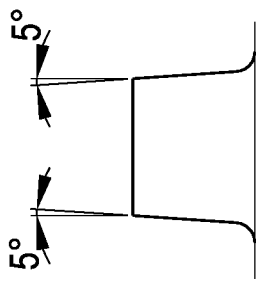

Furthermore, it has a second cross-section S2, taken along the line B-B of FIG. 2, that is substantially trapezoidal, as can be appreciated in FIG. 3C. This second cross-section S2, substantially trapezoidal, has respective oblique sides inclined by around 4°-6° with respect to the direction ND, normal to the tread, preferably 5°.

According to the present invention, the median block 21 and the central block 31 are separated by an inner groove 16 of said second grooves 15, 16.

This inner groove 16 has, in turn, an inner grooved channel 18 having a channel direction ICD that is inclined with respect to the transverse line TL by an internal angle θ of less than or equal to 90°, thus ensuring that the channel direction ECD is not exactly parallel to the center line CL of the pneumatic tire. This is advantageous in terms of performance on snow.

According to a preferred embodiment, the inner grooved channel 18 is substantially rectilinear.

Within the inner grooved channel 18 a second connecting block 60 may be provided between the median block 21 and the central block 31.

Figure 2B:
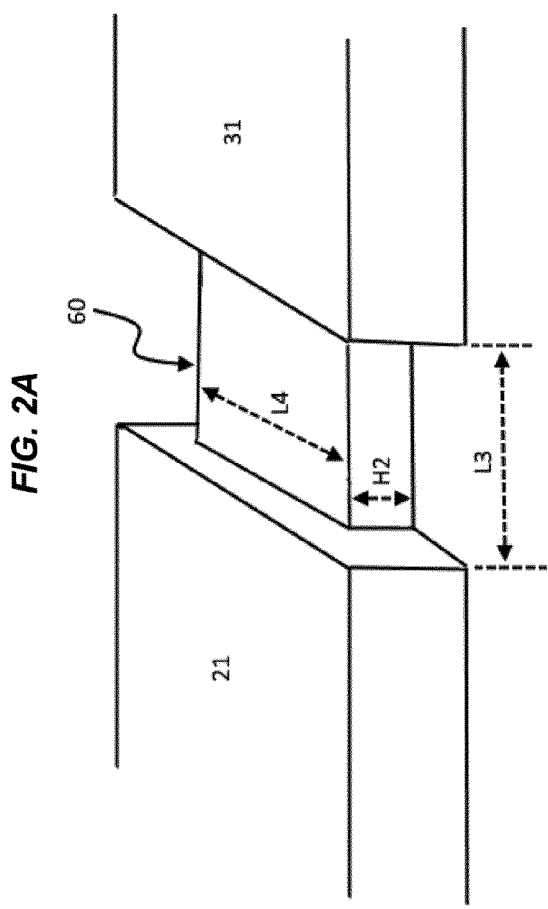

FIG. 2B shows, by way of example and schematically, the structure thereof.

The second connecting block 60 preferably has a height H2 that is less than the height of the median blocks 21 and the central blocks 31 that it connects, and a width L3 (the transverse dimension of the channel) that is less than the length L4 thereof (the longitudinal dimension of the channel). According to a preferred embodiment, the width L3 can be chosen to be equal to approximately 3% of the transverse semi-dimension STL of the tread.

According to some embodiments, the central block 31 may also have a longitudinal evolution that is substantially rectilinear.

Moreover, according to other embodiments, the central block 31 may have a third cross-section S3, taken along the line C-C of FIG. 2, that is substantially trapezoidal, as can be appreciated in FIG. 3D. Said third substantially trapezoidal cross-section S3, has respective oblique sides inclined by around 4°-6° with respect to the direction ND, normal to the tread, preferably by around 5°.

Some embodiments of the tread according to the present invention may also provide for the central block 31 to include an extremal protruding block 41 at one of the external walls 40 thereof. The projecting block 41 has a contact face 42 which is such to be substantially parallel to a lateral surface 70 of a further central block 31, which it faces, at the "V" form vertex of the tread element 5. Such a configuration, visible in FIGS. 1, 2 and 4, is advantageous insofar as it makes it possible to increase the stiffness of the tread in order to improve performance during braking.

According to a preferred embodiment, the extremal protruding block 41 occupies around ⅔ of the overall width LE of the extremal wall 40 of the block 31. Advantageously, it may also be arranged for the contact face 42, in turn, to occupy ¼ of the overall width LE of the extremal wall 40 of the block 31.

The shape is preferably such that the contact face 42 does not normally touch the surface 70 of the adjacent block but is in any case such to substantially and significantly restrict the groove 6 at the vertex of the "V". The sizing can, however, be such that during braking there is effectively contact between the two walls 42 and 70.

Again with reference to the region of the tread corresponding to the vertex of the "V", it is furthermore preferable that the extremal wall 40 of the block 31 has a fourth angle φ with respect to the line TL (orthogonal to the center line CL of the tread). According to preferred embodiments, this angle may vary between 40° and 60°.

As already indicated for the other characteristic angles α, β, γ, the fourth angle φ can also be chosen as a function of the pneumatic tire size. For example, for a pneumatic tire of the size 205/55 R16, the fourth angle φ is preferably equal to around 50.25°.

Figure 5:
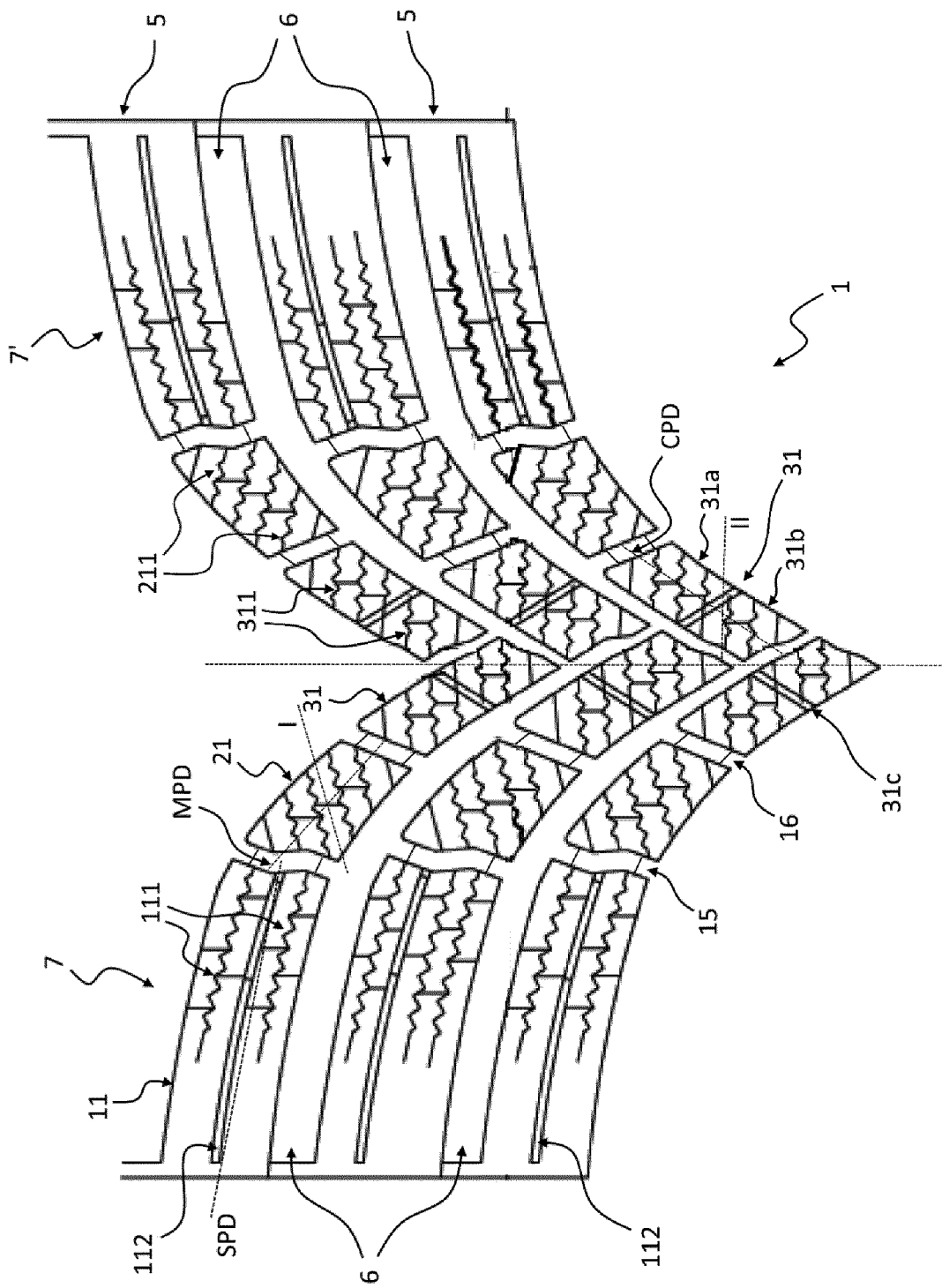
FIG. 5 is a plan view of a portion of a tread according to a first embodiment of the present invention.

With reference to FIG. 5, this shows a first embodiment of a tread 1 according to the present invention.

This first embodiment will be described whilst making reference to the previously described forms, and greater emphasis will therefore be given to the differences, exclusively with respect to said previously described forms. Identical or corresponding elements will therefore be indicated with the same numerical references According to the embodiment depicted in FIG. 5, the tread 1 includes a shoulder block 11 which comprises at least a first notch 111 with a longitudinal evolution, and then in the direction of the first major extension direction (SPD) of the block. This at least one first notch 11 may advantageously have a zig-zag evolution, at least for a part of the length thereof.

Advantageously, each shoulder block 11 of the tread, may provide for one or more first notches 111. For example, the tread may be shaped in such a way as to alternate shoulder blocks 11 with one, two or three first notches 111.

The first notches 111 are of the type commonly known as a 'sipe' and the presence thereof tends to improve the performance of the tread on snow-covered surfaces.

In addition, on one or more of the shoulder blocks 11, a longitudinal channel 112 can advantageously be provided for, wherein the depth thereof can vary between 39% and 41% of the height of the shoulder block 11.

Preferably, the longitudinal channel 112 extends over the shoulder block 11 until reaching and emerging at the second groove 15.

Figure 5A:
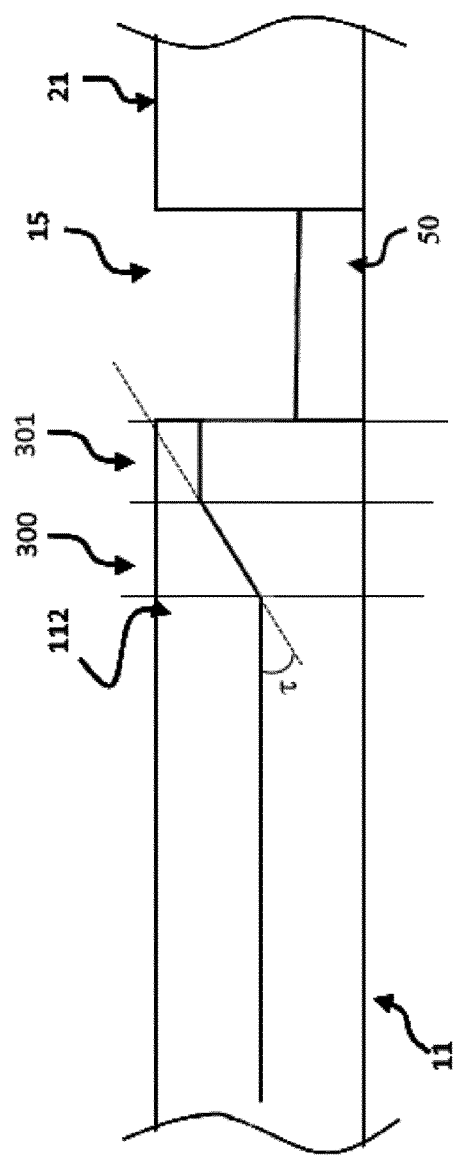
FIG. 5A shows schematically a longitudinal section of part of the tread.
Figure 6:
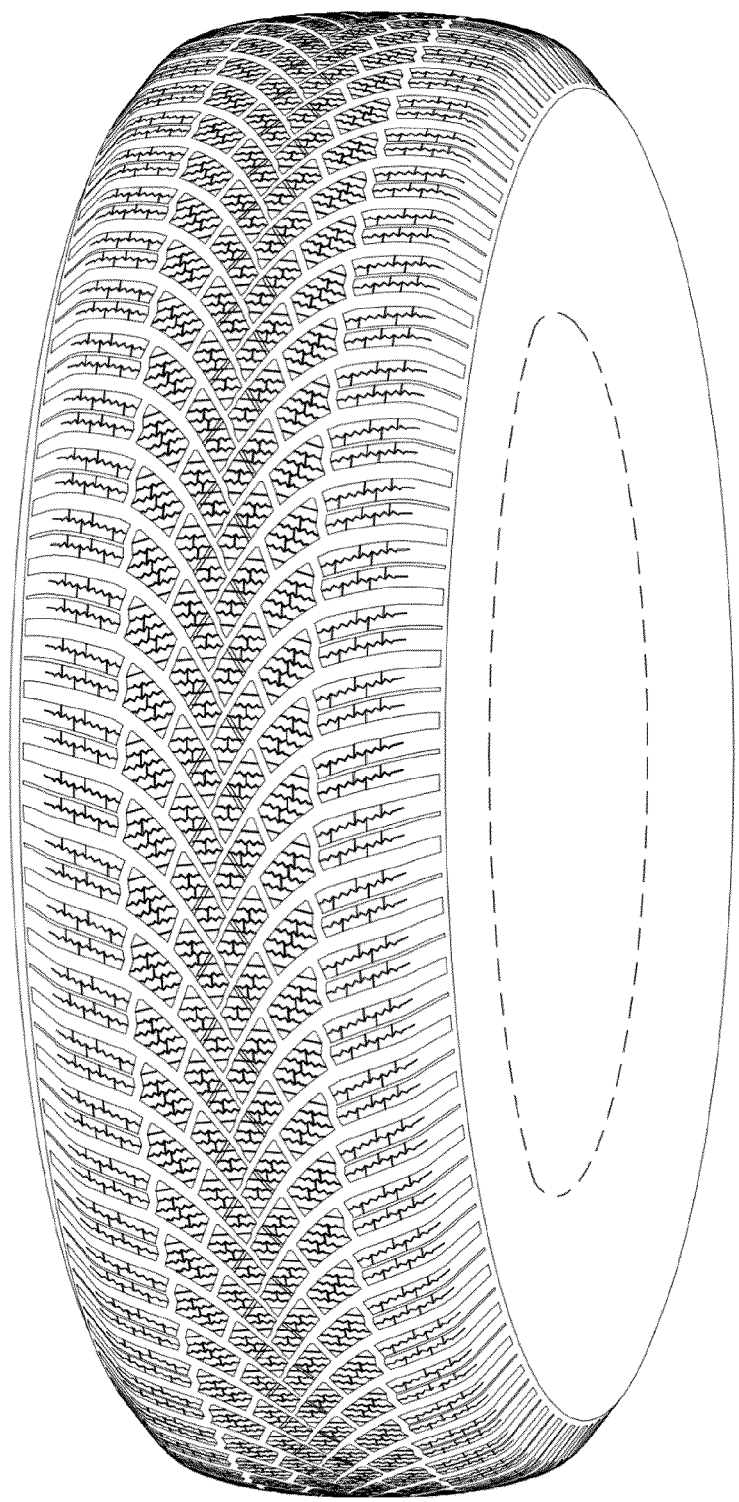
FIG. 6 is a partial perspective view of a pneumatic tire according to the present invention.

According to some embodiments, the longitudinal channel 112 comprises an end portion 300, 301 that faces the second groove 15, having a variable depth, which preferably includes at least one inclined portion 300 wherein the depth gradually decreases from the outside towards the inside of the pneumatic tire. In the vicinity of the interface with the second groove 15, a final tract 301 may advantageously be arranged, of the end portion of the channel 112, having a constant depth (less than the outer portion of the tread), as can be seen for example in FIG. 5A. The sloping section 300 may have a length, in the longitudinal direction of the evolution of the channel itself, equal to approximately 15 mm and 30 mm.

The inclination of the inclined portion 300 of the longitudinal channel 112 in relation to the contact surface of the shoulder block 11, can be represented by an angle τ ranging between 5° and 10°.

Further, when present, the length of the final tract 301, at a constant depth, can vary between 15 mm and 30 mm.

The feature being described appears advantageous for the improvement of the water expelling ability upon wet surfaces, and therefore the draining capacity of the pneumatic tire.

In addition, with the presence of this channel, traction on snow-covered surfaces is improved insofar as the imprint on the ground has both more edges in contact with the snow and a greater volume of trapped snow.

The particular shape of the variable cross-section channel increases the rigidity of the shoulder block, and therefore the deformations of said block. From here lesser deformations are derived and therefore less wear of the block itself.

On blocks with a width greater than or equal to 31 mm, the channel is inserted asymmetrically upon the shoulder block. In so doing there is space available for the insertion of an additional sipe (3 sipes) which increases the grip of the pneumatic tire on snowy roads.

Further structural and conformational characteristics of the shoulder block 11, all remain achievable as described with reference to those other embodiments that have already been described.

Similarly, according to this second embodiment, one, several or all of the intermediate blocks 21 of the tread 1, can have second sipes 211.

Preferably on the median blocks 21, the second sipes 211 are created according to a first direction I, angled with respect to the second major extension direction MPD of the median block 21. The angle between the two directions I and MPD can advantageously range between 43° and 61°, preferably approximately equal to 51°.

Some or all of the second sipes 211 on the median blocks can advantageously have a zig-zag evolution.

The different orientation of the direction of evolution of the sipes 211 on the median blocks 21, in relation to the direction of evolution of the second sipes 111 on shoulder blocks 11, contributes in an important way to further improving the performance of the tread in the event of use upon snowy roads.

Furthermore, according to such an embodiment, one, several or all of the central blocks 31 of the tread can have third sipes 311.

Preferably on the central blocks 31, the third sipes 311 are created according to a second direction II, angled with respect to the third major extension direction CPD of the central block 31. The angle between the two directions II and CPD can advantageously range between 50° and 70°, preferably approximately equal to 59°.

Some or all of the second sipes 311 on the median blocks can advantageously have a zig-zag evolution.

Additionally, one, several or all of the central blocks 31 can, according to this embodiment, be divided into two portions 31a and 31b. The division is in this case obtained by means of the formation of a transverse channel 31c wherein the depth thereof can vary between 17% and 18% of the height of the central block 31. The orientation of the channel 31c is preferably orthogonal with respect to the third major extension direction CPD of the central block 31, in such a way as to divide the central block 31 into two substantially rhomboid portions 31a and 31b. Preferably, the sipes formed by the second notches 311 are not interrupted by the channel 31c. The geometry of the sipes 311 on the channel 31c is of the "flat" type in order to optimize the rigidity of the two half blocks.

In this case, the third notches 311 can be created on one or both of the portions 31 and 31b.

Such a division into portions of the central block has the advantage of improving the performance of the tread when used on wet or muddy surfaces.

Figure 7:
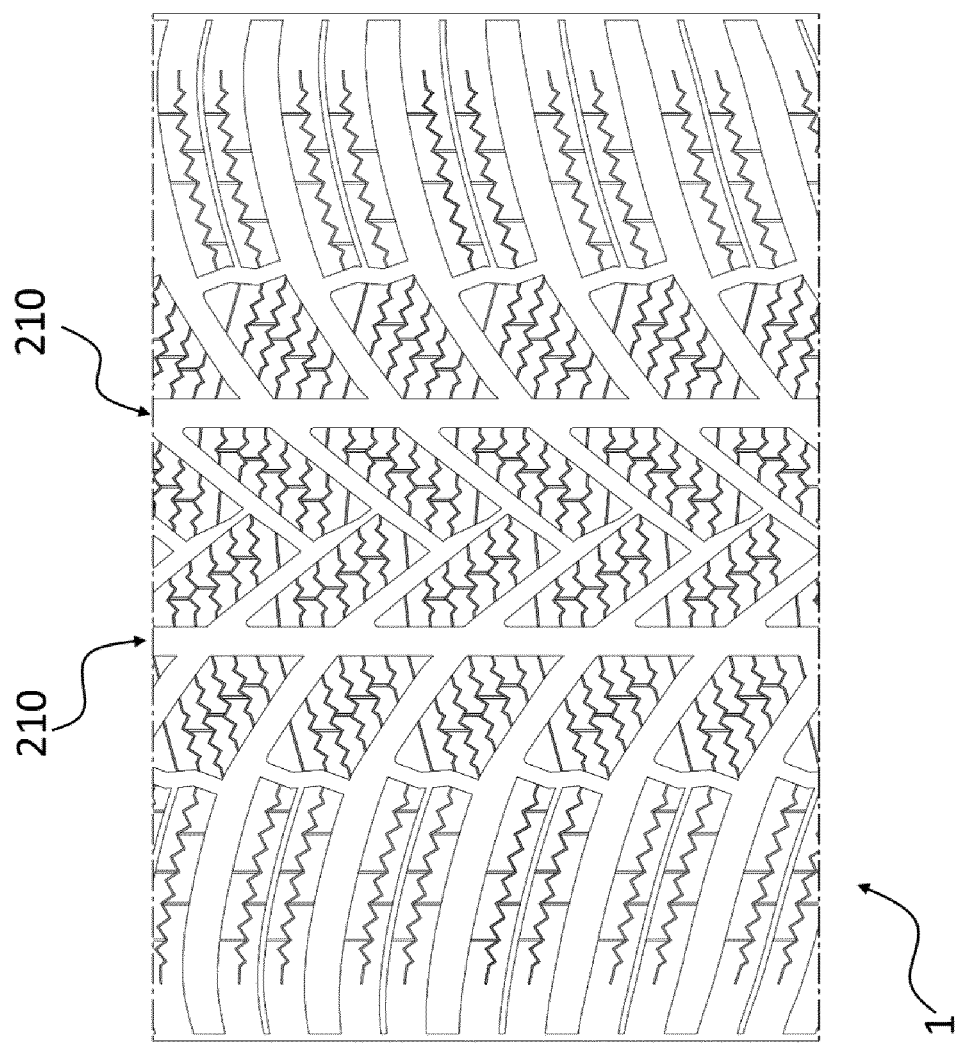
FIG. 7 is a plan view of a portion of a tread according to a second embodiment of the present invention.
Figure 8:
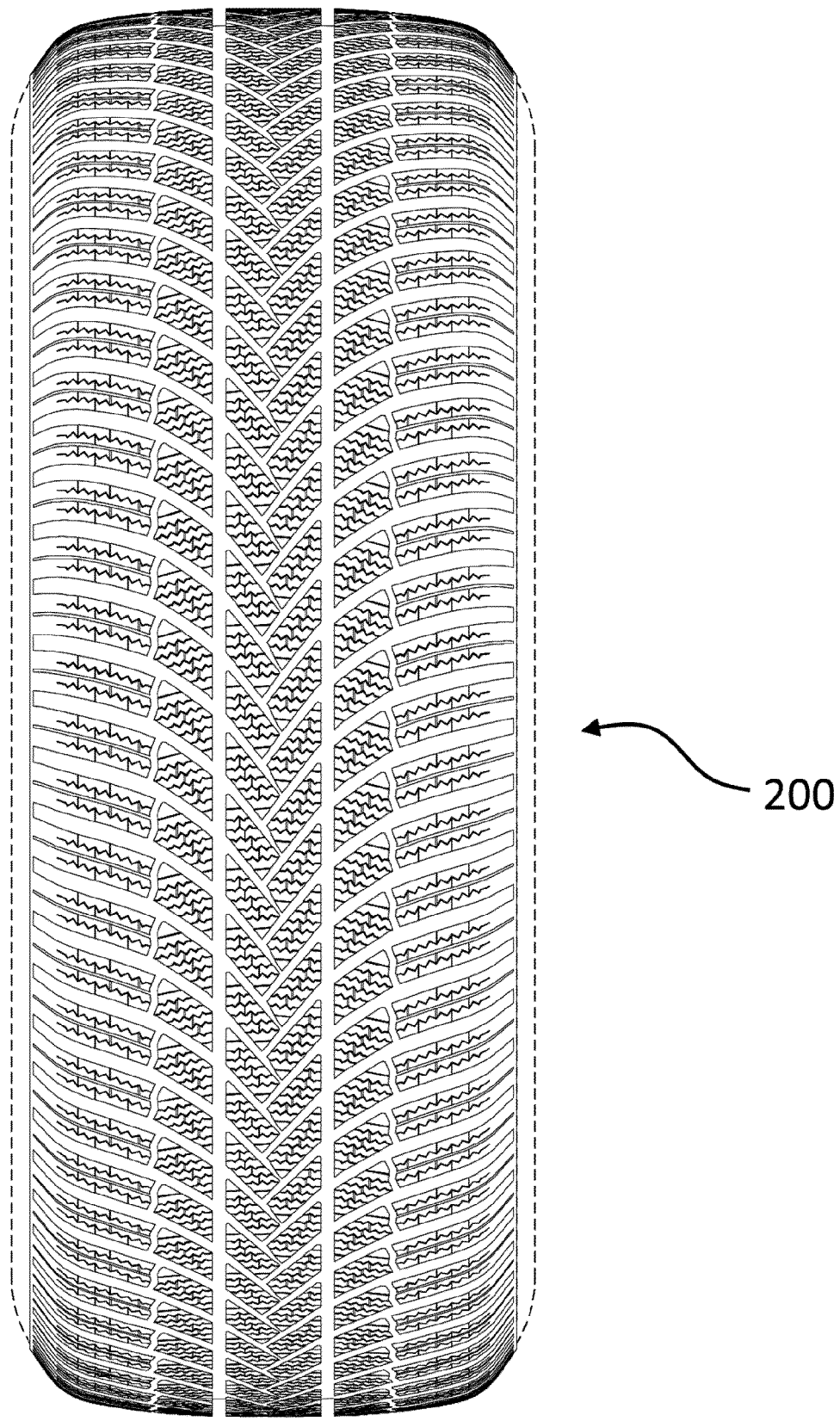
FIG. 8 is a perspective view of a pneumatic tire according to the invention, having a tread according to the second embodiment of FIG. 7.

The following FIGS. 7 and 8 refer respectively to a third embodiment of a tread according to the invention, and to a pneumatic tire 200 that incorporates such a third embodiment of the tread.

This third embodiment of the tread will not be described herein in detail, it being possible to apply all of the characteristics described so far in relation to the previous embodiments.

In particular, therefore, in addition to those features already described, the third embodiment can include one or two central grooves 210, along the circumferential direction of the pneumatic tire.

This conformation is preferably applied to pneumatic tires of a width equal to or greater than 245, with the advantage of having a higher percentage of voids, so as to improve the limit of aquaplaning and therefore grip on wet surfaces.

The present invention has heretofore been described with reference to the preferred embodiments thereof. It is intended that each of the technical solutions implemented in the preferred embodiments described herein by way of example can advantageously be combined in different ways between them, in order to give form to other embodiments, which belong to the same inventive nucleus and that all fall within the scope of protection afforded by the claims recited hereinafter.

The invention claimed is:

1. A tread for a pneumatic tire, comprising:
a sequence of tread elements arranged in succession and interspersed with first grooves, each tread element having an overall V shape with two lateral wings, each of said lateral wings being formed from three tread blocks separated there between by second grooves, wherein said three tread blocks comprise at least one shoulder block having a first major extension direction inclined by a first angle with respect to a line orthogonal to a center line of the tread ranging between 8° and 12°,
wherein said at least one shoulder block comprises at least one first notch with a longitudinal evolution according to said first major extension direction, said at least one first notch having a zig-zag evolution for at least part of a length thereof,
wherein each shoulder block comprises a channel with a longitudinal evolution which extends onto the shoulder block, until it reaches and emerges upon the corresponding second groove, and
wherein said channel with a longitudinal evolution comprises an end portion that opens onto said second groove, said end portion having a variable depth, said end portion having at least a first inclined portion wherein the depth gradually decreases from the outside towards the inside of the pneumatic tire and a second portion between the first portion and the second groove and which has a constant depth, as an interface between the channel and the second groove approaches,
wherein the at least first inclined portion has a length, in the longitudinal direction of the evolution of the channel itself, between 15 mm and 30 mm.

2. The tread of claim 1, wherein said channel with a longitudinal development has a depth which varies between 39% and 41% of the height of the shoulder block along the length of the channel.

3. The tread of claim 1, wherein each shoulder block comprises a longitudinal extension dimension equal to at least 40% of a tread half width of the tread.

4. The tread of claim 1, wherein the three tread blocks comprise a median block having a second major extension direction inclined by a second angle with respect to the line orthogonal to the center line of the tread ranging between 27° and 47°.

5. The tread of claim 4, wherein at least one of the median blocks comprises second notches having a zig-zag evolution for at least part of a length thereof.

6. The tread of claim 5, wherein said second notches are configured in accordance with a first direction angled with respect to said second major extension direction.

7. The tread of claim 6, wherein the angle between the first direction and the second major extension direction ranges between 43° and 61°.

8. The tread of claim 4, wherein said central block has a longitudinal extension dimension equal to at least 20% of a tread half width of the tread.

9. The tread of claim 4, wherein each of said three tread blocks comprise a central block having a third major extension direction inclined by a third angle with respect to the line orthogonal to the center line of the tread ranging between 45° and 66°.

10. The tread of claim 9, wherein at least one of the central blocks comprises third notches having a zig-zag evolution for at least part of a length thereof.

11. The tread of claim 10, wherein said third notches are created according to a second direction angled with respect to said third major extension direction.

12. The tread of claim 11, wherein an angle between the second direction and the third major extension direction ranges between 50° and 70°.

13. The tread of claim 9, wherein one or more of the central blocks are divided into two portions by a transverse channel.

14. The tread of claim 13, wherein a depth of said transverse channel ranges between 17% and 18% of the height of the central block.

15. The tread of claim 13, wherein an orientation of said transverse channel is orthogonal with respect to the third major extension direction of the central block, wherein the central block is divided into two substantially rhomboid portions.

16. The tread of claim 9, wherein said central block has a longitudinal extension dimension equal to at least 20% of a tread half width of the tread.

17. The tread of claim 4, wherein said shoulder block has a first cross-section which is substantially trapezoidal.

18. The tread of claim 17, wherein said shoulder block has a first leading surface inclined by about 10° with respect to a direction normal to an outer surface of the tread, at a second trailing surface inclined by about 5° with respect to said direction normal to the outer surface of the tread.

19. The tread of claim 4, wherein said shoulder block and median block are separated by an outer groove of said second grooves, said outer groove having an outer grooved channel having a channel direction inclined with respect to a transverse line orthogonal to said center line by an external angle of less than 90°.

20. The tread of claim 4, wherein said shoulder block and median block are separated by an outer groove of said second grooves, said outer groove having an outer grooved channel that is substantially Z shaped.

21. The tread of claim 4, wherein said shoulder block and median block are separated by an outer groove of said second grooves, said outer groove having an outer grooved channel, where within a first connecting block is provided between said shoulder block and median block, said first connecting block having a height that is less than a height of said shoulder block and median block and a width that is less than a length of said outer grooved channel.

22. The tread of claim 4, wherein said median block has a second cross-section which is substantially trapezoidal.

23. The tread of claim 22, wherein said second cross-section which is substantially trapezoidal has respective oblique sides, inclined between 4° and 6° with respect to a direction normal to an outer surface of the tread.

24. The tread of claim 4, wherein said median block and central block are separated by an inner groove of said second grooves, said inner groove having an inner grooved channel having a channel direction inclined with respect to a transverse line orthogonal to said center line, by an internal angle of less than or equal to 90°.

25. The tread of claim 4, wherein said median block and central block are separated by an inner groove of said second grooves, said inner groove having a rectilinear inner grooved channel.

26. The tread of claim 4, wherein said median block and central block are separated by an inner groove of said second grooves, said inner groove having an inner grooved channel, wherein a second connecting block is provided between said median block and central block, said second connecting block having a height that is less than the height of said median block and central block and a width that is less than the length of said inner grooved channel.

27. The tread of claim 4, wherein said central block has a third cross-section which is substantially trapezoidal.

28. The tread of claim 27, wherein said third cross-section which is substantially trapezoidal has respective oblique sides inclined by around 5° with respect to a direction normal to an outer surface of the tread.

29. The tread of claim 4, wherein said central block has an external wall having a protruding portion with a contact surface that is substantially parallel to a lateral surface of a further central block whereunto it faces at the vertex of said V shape of the tread element.

30. The tread of claim 4, further comprising one or more central grooves that are longitudinal in relation to the direction of circumferential evolution of the tread.

31. A pneumatic tire comprising:
a tread having:
a sequence of tread elements arranged in succession and interspersed with first grooves, each tread element having an overall V shape with two lateral wings, each of said lateral wings being formed from three tread blocks separated there between by second grooves,
wherein said three tread blocks comprise at least one shoulder block having a first major extension direction inclined by a first angle with respect to a line orthogonal to a center line of the tread ranging between 8° and 12°,
wherein said at least one shoulder block comprises at least one first notch with a longitudinal evolution according to said first major extension direction, said at least one first notch having a zig-zag evolution for at least part of a length thereof,
wherein each shoulder block comprises a channel with a longitudinal evolution which extends onto the shoulder block, until it reaches and emerges upon the corresponding second groove, and
wherein said channel with a longitudinal evolution comprises an end portion that opens onto said second groove, said end portion having a variable depth, said end portion having at least a first inclined portion wherein the depth gradually decreases from the outside towards the inside of the pneumatic tire and a second portion between the first portion and the second groove and which has a constant depth, as an interface between the channel and the second groove approaches,
wherein the at least first inclined portion has a length, in the longitudinal direction of the evolution of the channel itself, between 15 mm and 30 mm.

* * * * *